United States Patent Office 3,781,331
Patented Dec. 25, 1973

3,781,331
N-TRIHALOMETHANESULFENYL-N-
METHYL-CARBAMATES
Engelbert Kühle, Bergisch Gladbach, Erich Klauke, Odenthal-Hahnenberg, Wolfgang Behrenz, Cologne, and Paul Ernst Frohberger, Leverkusen, Germany, assignors to Bayer Aktiengesellschaft, Leverkusen, Germany
No Drawing. Filed Aug. 13, 1971, Ser. No. 171,746
Claims priority, application Germany, Aug. 20, 1970, P 20 41 322.3
Int. Cl. C07c 149/24
U.S. Cl. 260—479 C     7 Claims

ABSTRACT OF THE DISCLOSURE

N-trihalomethanesulfenyl-N-methyl-carbamates of the general formula

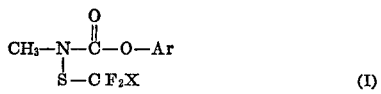

(I)

in which

X is chlorine or fluorine, and
Ar is a phenyl or naphthyl radical optionally substituted by at least one lower alkyl, alkoxy, alkylmercapto, dialkylamino, trifluormethyl, halogen or nitro radical, which possess insecticidal, acaricidal, fungicidal, bactericidal, microbicidal, algicidal and bird-repellent properties.

---

The present invention relates to and has for its objects the provision of particular new N-trihalomethane-sulfenyl-N-methyl-carbamate, i.e. N-trifluoro- or difluoro-chloro-methanesulfenyl-N-methyl-carbamic acid esters of optionally substituted phenols or naphthols, which possess insecticidal, acaricidal, fungicidal, bactericidal, microbicidal, algicidal and bird-repellent properties, active compositions in the form of mixtures of such compounds with solid and liquid dispersible carrier vehicles, and methods for producing such compounds and for using such compounds in a new way especially for combating pests, e.g. insects, acarids, fungi, bacteria, microorganisms, algae and birds, with other and further objects becoming apparent from a study of the within specification and accompanying examples.

It is known from German Pat. 921,290 that N-trichloro-methylthio compounds exhibit fungicidal and insecticidal properties. It is known from Angewandte Chemie, 76, 807 (1964) that N-fluorodichloromethylthio compounds are used as fungicides and acaricides.

Representatives of both classes of compounds, such as N-(trichloromethylthio)-phthalimide (Compound C) and N,N-dimethyl-N'-phenyl-N' - (fluorodichloromethylthio)-sulfonyl diamide (Compound B), have found acceptance in practice. Finally, it is also known that, in general, methylcarbamic acid aryl esters are insecticidally effective. Thus, methylcarbamic acid 2-isopropoxyphenyl ester is of importance as an insecticide and acaricide.

The present invention provides N-trihalomethanesulfenyl-N-methyl-carbamates of the general formula

(I)

in which

X is chlorine or fluorine, and
Ar is a phenyl or naphthyl radical optionally substituted by at least one lower alkyl, alkoxy, alkylmercapto, dialkylamino, trifluoromethyl, halogen or nitro radical.

These compounds have strong insecticidal, acaricidal and fungicidal properties.

Furthermore, it has been found that the N-trihalomethanesulfenyl-N-methyl-carbamates of the Formula I are obtained when N - trihalomethanesulfenyl-N-methyl-carbamic acid fluorides of the formula

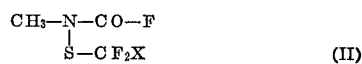

(II)

in which

X has the meaning stated above, are reacted with phenols of the formula

HO—Ar          (III)

in which

Ar has the meaning stated above, in the presence of a diluent, the phenols being used together with an acid binding agent or in the form of a salt.

It is very surprising that the compounds according to the invention exhibit a higher insecticidal, acaricidal and fungicidal potency than the previously known N-trihalomethylthio compounds. The substances according to the invention therefore represent an enrichment of the art.

The reaction course when N-(difluorochloromethanesulfenyl)-N-methyl-carbamic acid fluoride and phenol are used as starting materials can be represented by the following formula scheme:

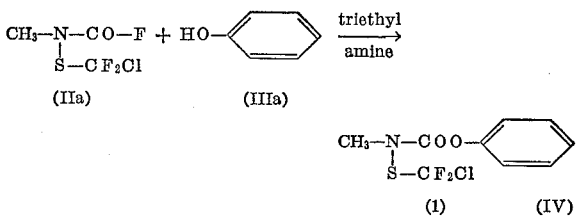

The N-trihalomethanesulfenyl-N-methyl-carbamic acid fluorides of Formula II are known. As disclosed in Belgian Pat. 717,705, they are obtainable from N-methylcarbamic acid fluoride and an appropriate N-trihalomethanesulfenyl chloride in the presence of a tertiary amine.

Ar of Formula III is a phenyl or naphthyl radical in which preferred substituents are methyl, trifluoromethyl, ethyl, propyl, methoxy, methylmercapto, dimethylamino, chlorine and/or the nitro group.

Examples of the phenolic compounds which can be used in the present process include phenol, cresols, xylenols, tert.-butylphenols, isopropylphenols, dimethylaminophenols, chlorophenols, dichlorophenols, nitro-phenols, 2-chloro-4-nitrophenol, 2-isopropoxyphenol, 2 - ethoxyphenol, 3-methyl-4-methylmercaptophenol, 4-trifluoromethylphenol and 1-naphthol and 2-naphthol. These phenols and naphthols are known.

As diluent, all inert organic solvents are suitable. They include ethers, such as diethyl ether, tetrahydrofurane and dioxane; hydrocarbons, such as benzene; and chlorinated hydrocarbons, such as chloroform and chlorobenzene.

An acid binding agent may be used in order to bind the hydrogen fluoride formed in the reaction. Examples of acid binding agents are tertiary bases such as triethylamine and inorganic bases such as alkali metal hydroxides or alkali metal carbonates. It is also possible to start directly from the alkali metal phenolates and to carry out the reaction according to the invention in aqueous phase.

The reaction temperatures can be varied within a fairly wide range; in general, the reaction is carried out at about 0 to 100° C., preferably at about 20 to 40° C.

When carrying out the process according to the invention, molar amounts are generally used. In many cases, it has appeared to be advantageous if the phenol component is used in slight excess (about 5 to 20 percent by weight).

The working up of the reaction mixture may take place in customary manner.

The active compounds according to the invention exhibit strong insecticidal and acaricidal effects with low phytotoxicity. The active compounds can therefore be used with good results for the control of noxious sucking and biting insects, diptera and mites (Acarina). They are therefore valuable for hygiene purposes, for crop protection of stored products.

To the sucking insects contemplated herein there belong, in the main, aphids, (Aphidae) such as the green peach aphid (*Myzus persicae*), the bean aphid (*Doralis fabae*); scales, such as *Aspidiotus hederae, Lecanium hesperidum, Pseudococcus maritimus*; Thysanoptera, such as *Hercinothrips femoralis*; and bugs, such as the beet bug (*Piesma quadrata*) and the bed bug (*Cimex lectularius*); and the like.

With the biting insects contemplated herein there are classed, in the main, butterfly caterpillars, such as *Plutella maculipennis, Lymantria dispar*; beetles, such as granary weevils (*Sitophilus granarius*). the Colorado beetle (*Leptinotarsa decemlineata*), and also species living in the soil, such as the wireworm (Agriotes sp.) and larvae of cockchafer (*Melolontha melolontha*); cockroaches, such as the German cockroach (*Blattella germanica*) and the oriental crockroach (*Blatta orientalis*); Orthoptera, such as the house cricket (*Acheta domesticus*); termites, such as Reticulitermes; Hymenoptera, such as ants; and the like.

The Diptera contemplated herein comprise in particular the flies, such as the vinegar fly (*Drosophila melanogaster*), The Mediterranean fruit fly (*Ceratitis capitata*), the house fly (*Musca domestica*); stinging flies, such as e.g. the stable fly (*Stomoxys calcitrans*); and gnats, such as the mosquito *Aedes aegypti*; and the like.

In the case of the mites contemplated herein, particularly important are the spider mites (Tetranychidae), such as the common spider mite (*Tetranychus urticae*), the European red mite (*Panonychus ulmi*); gall mites, such as the black currant gall mite (*Eriophyes ribs*) and tarsonemids, such as *Tarsonemus pallidus*; the poultry mite (*Dermanyssus galinae*); and ticks; and the like.

The effects set in rapidly and are long-lasting.

The active compounds according to the invention also exhibit a strong fungitoxic activity against phytopathogenic fungi. Their good toleration by warm-blooded animals and higher plants permits their use as crop protection agents against fungal diseases. In the concentration necessary for the control of the fungi they do not damage cultivated plants. Fungitoxic agents in crop protection are used for the control of fungi from the most diverse classes of fungi, such as Archimycetes, Phycomycetes, Ascomycetes, Basidiomycetes and *Fungi imperfecti*.

The active compounds according to the invention have a very broad activity spectrum. They can be used against parasitic fungi on above-the-ground parts of plants, fungi causing tracheomycosis which attack the plants from the soil, seed-borne fungi and soil-inhabiting fungi.

The active compounds are likewise highly effective and of particular practical importance when they are used as seed dressings or soil treatment agents against phytopathogenic fungi which adhere to the seed or occur in the soil and cause, on cultivated plants, seedling diseases, root rots, tracheomycoses, stem, blade, leaf, blossom, fruit or seed diseases, such as *Tilletia caries, Helminthosporium gramineum, Fusarium nivale, Fusarium culmorum, Rhizoctonia solani, Phialophora cinerescens, Verticillium alboatrum, Fusarium solani, Sclerotina sclerotiorum, Thielaviopsis basicola* and *Phytophthora cactorum*.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspenions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides, fungicides, bactericides, microbicides, algicides, and bird repellents, or nematocides, rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10% by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95% by weight of the mixture.

The active compounds can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 98% by weight of the active compound or even the 100% active substance alone, e.g. about 20–100% by weight of the active compound.

In seed treatment, there are required, in general, amounts of active compound of 0.01 to 10 g. per kg. of seed, preferably 0.1 to 5 g. For soil treatment, amounts of active compound of 1 to 500 g. per cubic meter of soil, preferably 10–200 g., are generally necessary.

Furthermore, the present invention contemplates methods of selectively killing, combating or controlling pests, e.g. insects, acarids, fungi, bacteria, microorganisms, algae and birds, and more particularly methods of combating at least one of insects, acarids and fungi, which comprises applying to at least one of correspondingly (a) such insects, (b) such acarids, (c) such fungi, (d) such bacteria, (e) such microorganisms, (f) such algae, (g) such birds, and (h) the corresponding habitat thereof, i.e. the locus to be protected, a correspondingly combative or toxic amount, i.e. an insecticidally, acaricidally, fungicidally, bactericidally, microbicidally, algicidally or bird-repellent effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples.

EXAMPLE 1

Agar plate test.—Test for fungitoxic effectiveness and breadth of the activity spectrum Solvent: Acetone.
Parts by weight: (a) 1000.

To produce a suitable preparation of the active compound, 1 part by weight of the active compound is taken up in the stated amount of solvent.

To potato dextrose agar which has been liquefied by heating there is added the preparation of the active compound in such an amount that the desired concentration of active compound is set up therein. After thorough shaking to achieve a uniform dispersion of the active compound, the agar is poured into Petri dishes under sterile conditions. When the mixture of substrate and active compound has solidified, test fungi from pure cultures are inoculated on to it in small discs of 5 mm. diameter. The Petri dishes remain at 20° C. for 3 days for incubation.

After this time, the inhibiting action of the active compound on the mycelium growth is determined in categories, taking into account the untreated control. 0 means no mycelium growth, either on the treated substrate or on the inoculum; the symbol − means mycelium growth on the inoculum only, no spread to the treated substrate; and the symbol + means mycelium growth from the inoculum on to the treated substrate, similar to the spread to the untreated substrate of the control.

The active compounds, the concentration of the active compounds, the test fungi and the inhibition effects achieved can be seen from the following Table 1:

TABLE 1
[Agar plate test]

| Active compound | Concentration of active compound in the substrate in mg./liter | Corticium rolfsii | Sclerotinia sclerotiorum | Verticillium alboatrum | Thielaviopsis basicola | Phytophthora cactorum | Fusarium culmorum | Fusarium oxysporum | Fusarium solani f. pisi |
|---|---|---|---|---|---|---|---|---|---|
| Untreated | | + | + | + | + | + | + | + | + |
| (A) 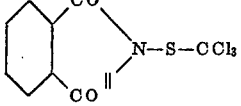 (known) | 10 | − | + | + | 0 | | + | + | + |
| (2) 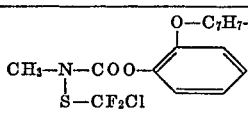 | 10 | 0 | 0 | 0 | 0 | 0 | 0 | 0 | 0 |
| (3) 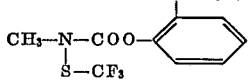 | 10 | 0 | 0 | 0 | 0 | 0 | 0 | 0 | 0 |

EXAMPLE 2

Soil treating agent test/soil-borne mycoses

To produce a suitable preparation of the active compound, the active compound is extended with talc to a content of 5% and subsequently with quartz sand to a content of 0.5% of active compound.

The preparation of the active compound is uniformly mixed with Fruhstorfer standard soil, which has first been sterilized and then inoculated with pure cultures of the test fungi.

The soil is filled into 5 pots, each of which is sown with 10 seeds of the host plants. The pots are placed in a greenhouse at the stated temperatures and kept normally moist.

3 weeks after sowing, the number of healthy plants is determined as a percentage of the number of seeds sown. 0% means that no healthy plants have grown; 100% means that healthy plants have resulted from all the seeds.

The active compounds, the concentrations of the active compounds in the soil, the test fungi, host plants, greenhouse temperatures and the results obtained can be seen from Table 2:

filter paper discs in closed Petri dishes, is exposed to a temperature of 4° C. for 10 days in a refrigerator. The germination of the barley, and possibly also of the fungus spores, is thereby initiated. Two batches of 50 grains of

TABLE 2

[Soil treating agent test/soil-borne mycosis]

| Active compound | | Concentration of active compound in mg./liter soil | Test fungi, *Rhizoct. solani*; Host plant, pea; Temperature range, 18-22° |
|---|---|---|---|
| Fruhstorfer standard soil, sterilized untreated. | | | 95 |
| Fruhstorfer standard soil, sterilized and inoculated untreated. | | | 0 |
| (A) | 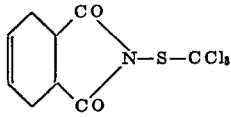 (known) | 100 | 24 |
| (C) | 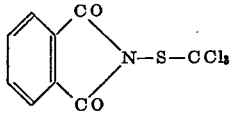 (known) | 100 | 54 |
| (D) | 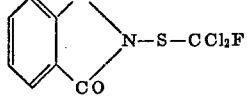 (known) | 100 | 12 |
| (B) | 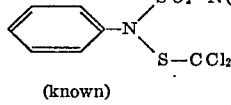 (known) | 100 | 16 |
| (3) | 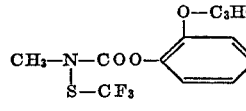 | 100 | 75 |

EXAMPLE 3

Seed dressing test/stripe disease of barley (seed-borne mycosis)

To produce a suitable dry dressing, the active compound is extended with a mixture of equal parts by weight of talc and kieselguhr to give a finely powdered mixture with the desired concentration of active compound.

To apply the dressing, barley seed, which is naturally infested by *Helminthosporium gramineum*, is shaken with the dressing in a closed glass flask. The seed, on moist the pregerminated barley are subsequently sown 2 cm. deep in Fruhstorfer standard soil and cultivated in a greenhouse at temperatures of about 18° C. in seed boxes which are exposed to light for 16 hours daily. The typical symptoms of the stripe disease develop within 3 to 4 weeks.

After this time, the number of diseased plants is determined as a percentage of the total number of emerged plants. The fewer plants are diseased, the more effective is the active compound.

The active compounds, the concentration of the active compounds in the dressing, the amounts of dressing used and the number of diseased plants can be seen from Table 3:

TABLE 3
[Seed dressing test/stripe disease of barley]

| Active compound | Concentration of active compound in the dressing in percent by weight | Applied amount of dressing in g./kg. seed | Number of stripe-diseased plants as a percentage of the total number of emerged plants |
|---|---|---|---|
| Non-dressed | | | 36.0 |
| (D) 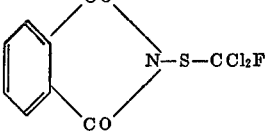 (known) | 10<br>30 | 2<br>2 | 15.2<br>15.6 |
| (B) 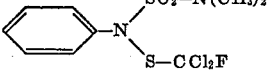 (known) | 30 | 2 | 24.0 |
| (2) 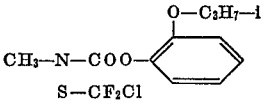 | 3<br>10 | 2<br>2 | 3.1<br>0.0 |
| (3) 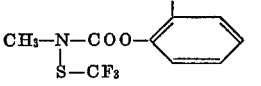 | 3<br>10 | 2<br>2 | 1.1<br>1.1 |

EXAMPLE 4

LT$_{100}$ test for *Aedes aegypti*

Solvent: Acetone.

2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 *Aedes aegypti* are then placed in the Petri dish and it is covered with a glass lid.

The condition of the test animals is periodically observed. The time which is necessary for a 100% destruction is determined.

The active compounds, the concentrations of the active compounds and the periods of time at which there is a 100% destruction can be seen from the following Table 4:

TABLE 4
LT$_{100}$ test for *Aedes aegyptii*

| Active compounds | Concentration of active compound of the solution in percent | LT$_{100}$, minutes |
|---|---|---|
| (E) 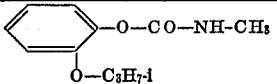 (known) | 0.00032 | 210 |
| (3) 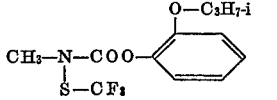 | 0.00032<br>0.000064 | 60<br>180 |
| (2) 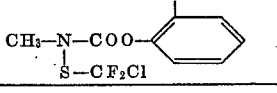 | 0.00032 | 60 |

EXAMPLE 5

LT$_{100}$ test for *Musca domestica*

Solvent: Acetone.

2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 *Musca domestica* are then placed in the Petri dish and it is covered with a glass lid.

The condition of the test animals is periodically observed. The time which is necessary for a 100% destruction is determined.

The active compounds, the concentrations of the active compounds and the periods of time at which there is a 100% destruction can be seen from the following Table 5:

TABLE 5
[LT$_{100}$ test for *Musca domestica*

| Active compounds | Concentration of active compound of the solution in percent | LT$_{100}$, minutes |
|---|---|---|
| (E) 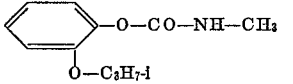 (known) | 0.008<br>0.0016 | 120<br>4$^h$=5% |
| (3) 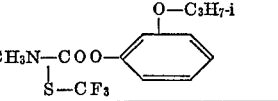 | 0.008<br>0.0016 | 45<br>180 |
| (2) 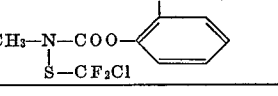 | 0.008<br>0.0016 | 45<br>4$^h$=90% |

EXAMPLE 6

**LT$_{100}$ test for *Blatta orientalis* ♀**

Solvent: Acetone.

2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 10 *Blatta orientalis* ♀ are then placed in the Petri dish and it is covered with a glass lid.

Within a space of time of 3 hours, there is determined the time which is necessary for a 100% destruction.

The active compounds, the concentrations of the active compounds and the periods of time at which there is a 100% destruction can be seen from the Table 6.

TABLE 6
[LT$_{100}$ test for *Blatta orientalis* ♀]

| Active compounds | Concentration of active compound of the solution in percent | LT$_{100}$, minutes |
|---|---|---|
| (E) 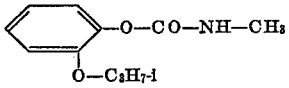 (known) | 0.008 | 3$^h$-60% |
| (3) 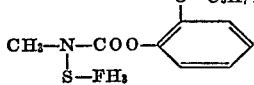 | 0.008 | 105 |
| (2) 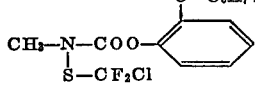 | 0.008 | 105 |

EXAMPLE 7

Tetranychus test

Solvent: 3 parts by weight dimethyl formamide.
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 7:

TABLE 7
[Tetranychus test (plant-damaging mites)]

| Active compounds | Concentration of active compound in percent | Degree of destruction in percent after 2 days |
|---|---|---|
| (E) 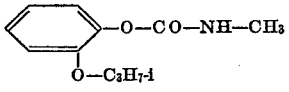 (known) | 0.2 | 0 |
| (3) 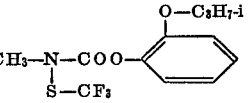 | 0.2 | 95 |
| (2) 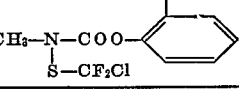 | 0.2<br>0.02 | 100<br>40 |

EXAMPLE 8

Drosophila test

Solvent: 3 parts by weight dimethyl formamide.
Emulsifier: 1 part by weight alkylarylpolyglycol ether.

To produce a suitable preparation of active compound, 1 part by weight of the active compound is mixed with the stated amount of solvent containing the stated amount of emulsifier, and the concentrate is diluted with water to the desired concentration.

1 cc. of the preparation of the active compound is applied with a pipette to a filter paper disc of 7 cm. diameter. The wet disc is placed in a glass vessel containing 50 vinegar flies (*Drosophila melanogaster*) and covered with a glass plate.

After the specified periods of time, the destruction is determined as a percentage: 100% means that all the flies are killed; 0% means that none of the flies are killed.

The active compounds, their concentrations, the evaluation times and the degree of destruction can be seen from Table 8.

TABLE 8
[Drosophila test (plant-damaging insects]

| Active compounds | Concentration of active compound in percent | Degree of destruction in percent after 1 day |
|---|---|---|
| (E) 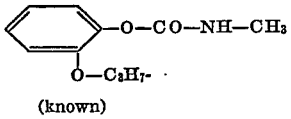 (known) | 0.2<br>0.02<br>0.002 | 100<br>99<br>0 |
| (3) 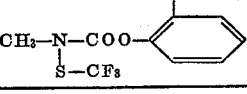 | 0.2<br>0.02<br>0.002<br>0.0002 | 100<br>100<br>100<br>45 |
| (2) 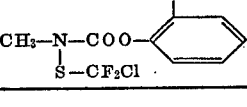 | 0.2<br>0.02<br>0.002<br>0.0002 | 100<br>100<br>100<br>50 |

EXAMPLE 9

Myzus test (contact action)

Solvent: 3 parts by weight dimethyl formamide.
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 9:

TABLE 9
[Myzus Test (Plant-Damaging Insects)]

| Active compounds | Concentration of active compound in percent | Degree of destruction in percent after 1 day |
|---|---|---|
| (E) 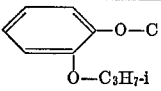 (known) | 0.2<br>0.02<br>0.002 | 100<br>98<br>0 |
| (2) 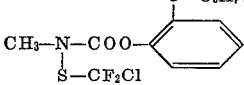 | 0.2<br>0.02<br>0.002<br>0.0002 | 100<br>100<br>50<br>20 |

EXAMPLE 10

Doralis test (systemic action)

Solvent: 3 parts by weight.
Emulsifier: 1 part by weight alkylarylpolyglycol ether.

To produce a suitable preparation of active compound, 1 part by weight of the active compound is mixed with the stated amount of solvent containing the stated amount of emulsifier, and the concentrate is diluted with water to the desired concentration.

Bean plants (*Vicia faba*) which have been heavily infested with the bean aphid (*Doralis fabae*) are watered with the preparation of the active compound so that the preparation of active compound penetrates into the soil without wetting the leaves of the bean plants. The active compound is taken up by the bean plants from the soil and thus reaches the infested leaves.

After the specified period of time, the degree of destruction is determined as a percentage. 100% means that all aphids are killed; 0% means that none of the aphids are killed.

The active compounds, the concentrations of the active compounds, the evaluation time and the results can be seen from the following Table 10:

TABLE 10
[Doralis test, systemic action (plant-damaging insects)]

| Active compounds | Concentration of active compound in percent | Degree of destruction in percent after 4 days |
|---|---|---|
| (E) 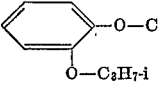 (known) | 0.2<br>0.02<br>0.002 | 100<br>100<br>0 |
| (2) 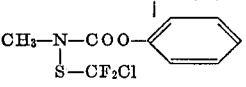 | 0.2<br>0.02<br>0.002 | 100<br>100<br>100 |

The following further examples are set forth to illustrate, without limitation, the process for producing active compounds according to the present invention.

EXAMPLE 11

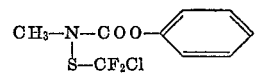   (1)

9.7 g. (0.05 mole) of N - (difluorochloromethylmercapto)-N-methylcarbamic acid fluoride and 5 g. (0.055 mole) of phenol are dissolved in 50 ml. of dioxane. 5.5 g. (0.055 mole) of triethylamine are added at room temperature and the temperature is allowed to rise. The reaction material is introduced into water and the oil which forms is taken up in toluene. After drying of the toluene solution, the solvent is evaporated in a vacuum and the 12 g. residue is distilled in a high vacuum. There are obtained 11 g. of the above compound of B.P. 96–98° C./0.08 mm. Hg and refractive index $n_D^{20}$=1.5078.

EXAMPLES 12–18

In analogous manner to that of Example 11, the following compounds are obtained.

| | Compound | Boiling point, °C./ mm. Hg | Refractive index, $n_S^{20}$ |
|---|---|---|---|
| (4) | 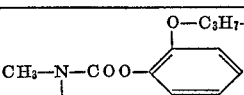 | 90–94/ 0.08 | 1.5199 |
| (5) | 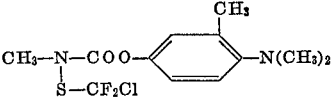 | 112–114/ 0.08 | 1.5225 |
| (2) | 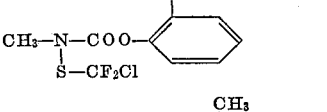 | 109–110/ 0.04 | 1.5025 |
| (6) | 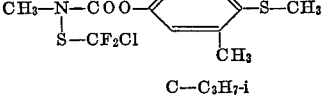 | 127–129/ 0.1 | 1.5482 |
| (3) | 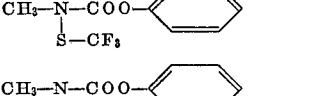 | 82–85/ 0.04 | 1.4808 |
| (7) | 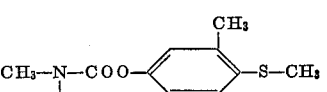 | 56–63/ 0.1 | 1.4810 |
| (8) | 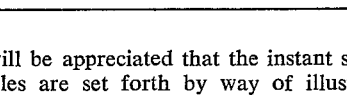 | 110–114/ 0.08 | 1.5239 |

It will be appreciated that the instant specification and examples are set forth by way of illustration and not limitation, and that various modifications and changes may be made without departing from the spirit and scope of the present invention.

What is claimed is:

1. N-trihalomethanesulfenyl-N-methyl - carbamates of the general formula

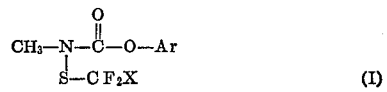   (I)

in which
X is chlorine or fluorine, and
Ar is a phenyl or naphthyl radical optionally substituted by at least one lower alkyl, lower alkoxy, lower alkylmercapto, di-lower alkylamino, trifluoromethyl, halogen or nitro radical.

2. Compounds according to claim 1 in which Ar is a phenyl or naphthyl radical optionally substituted by at least one methyl, ethyl, propyl, methoxy, methylmercapto, dimethylamino, trifluoromethyl, chlorine or nitro radical.

3. The compound according to claim 1 wherein such compound is the phenyl ester of N-(difluorochloromethanesulfenyl)-N-methyl-carbamic acid of the formula

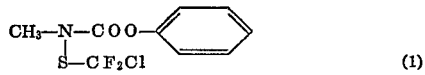 (1)

4. The compound according to claim 1 wherein such compound is the 2-chlorophenyl ester of N-(difluorochloromethanesulfenyl)-N-methyl - carbamic acid of the formula

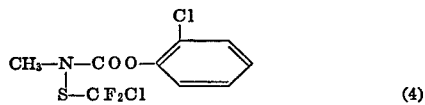 (4)

5. The compound according to claim 1 wherein such compound is the 3-methyl-4-dimethylaminophenyl ester of N - (difluorochloromethanesulfenyl) - N - methyl-carbamic of the formula

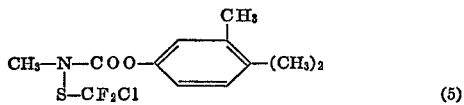 (5)

6. The compound according to claim 1 wherein such compound is the 2-isopropoxyphenyl ester of N-(difluorochloromethanesulfenyl)-N - methyl - carbamic acid of the formula

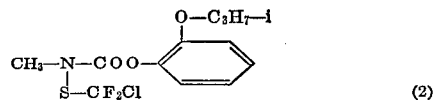 (2)

7. The compound according to claim 1 wherein such compound is the 2-isopropoxyphenyl ester of N-(trifluoromethanesulfenyl)-N-methyl-carbamic acid of the formula

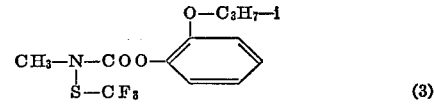 (3)

References Cited
UNITED STATES PATENTS 3,344,153    9/1967    Kuhle et al. _____ 260—347.2
3,663,594    5/1972    Brown et al. _____ 260—470

FOREIGN PATENTS 1,493,581    7/1967    France.

JAMES A. PATTEN, Primary Examiner

U.S. Cl. X.R.

71—98; 424—300

UNITED STATES PATENT OFFICE
CERTIFICATE OF CORRECTION

Patent No. 3,781,331  Dated December 25, 1973

Inventor(s) Engelbert Kuhle et al.

It is certified that error appears in the above-identified patent and that said Letters Patent are hereby corrected as shown below:

Col. 3, line 74, correct spelling of "scelortina".

Col. 5, Table 1, Compound (A), correct formula to read:

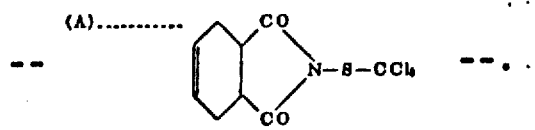

Col. 5, Table 1, Compound (2), in the formula, change "$C_7$" to -- $C_3$ --.

Col. 11, Table 6, Compound (3), change "$FH_3$" to -- $CF_3$ --.

Col. 12, line 45, Table 8 correct spelling of "Drosophila".

Col. 14, line 24, in the heading of the last column, change "$n_n^{20}$" to -- $n_D^{20}$ --.

Col. 14, line 26, Compound (4) in the Table, cancel " $O-C_3H_7 i$ " and substitute therefor -- $Cl$ -- ;

Same compound, under heading "Boiling point °C./mm Hg" change " 94 " to -- 92 --.

Col. 14, Compound 3 in the Table, change "$C-C_3H_7 i$" to -- $O-C_3H_7 i$ --.

Signed and sealed this 29th day of October 1974.

(SEAL)
Attest:

McCOY M. GIBSON JR.
Attesting Officer

C. MARSHALL DANN
Commissioner of Patents